(12) United States Patent
Sachtleben

(10) Patent No.: US 9,375,113 B2
(45) Date of Patent: Jun. 28, 2016

(54) COFFEE MACHINE

(71) Applicant: Andreas Sachtleben, Minden (DE)

(72) Inventor: Andreas Sachtleben, Minden (DE)

(73) Assignee: MELITTA EUROPA GMBH CO. KG, Minden (DE)

( * ) Notice: Subject to any disclaimer, the term of this patent is extended or adjusted under 35 U.S.C. 154(b) by 289 days.

(21) Appl. No.: 13/972,565

(22) Filed: Aug. 21, 2013

(65) Prior Publication Data

US 2014/0165848 A1    Jun. 19, 2014

(30) Foreign Application Priority Data

Aug. 21, 2012    (DE) ...................... 20 2012 103 158 U

(51) Int. Cl.
*A47J 31/44*    (2006.01)
*A47J 31/057*    (2006.01)
*A47J 31/06*    (2006.01)

(52) U.S. Cl.
CPC ............ *A47J 31/446* (2013.01); *A47J 31/0573* (2013.01); *A47J 31/06* (2013.01); *A47J 31/057* (2013.01)

(58) Field of Classification Search
CPC ...... A47J 31/057; A47J 31/0573; A47J 31/06
USPC ............ 99/304, 305, 306, 307, 308, 323, 299
See application file for complete search history.

(56) References Cited

U.S. PATENT DOCUMENTS

| | | | | |
|---|---|---|---|---|
| 3,343,478 A * | 9/1967 | Hausam | ......................... | 99/283 |
| 3,793,935 A * | 2/1974 | Martin | ............................ | 99/295 |
| 5,133,247 A * | 7/1992 | Pastrick | ........................ | 99/295 |
| 5,240,722 A * | 8/1993 | Louridas | ........................ | 426/77 |
| 5,335,589 A * | 8/1994 | Yerves et al. | ................... | 99/295 |
| 5,555,791 A * | 9/1996 | McNeill et al. | ................. | 99/295 |
| 7,966,926 B2 * | 6/2011 | Hart et al. | ....................... | 99/279 |

* cited by examiner

*Primary Examiner* — Reginald L Alexander
(74) *Attorney, Agent, or Firm* — FisherBroyles, LLP; Robert Kinberg

(57) ABSTRACT

An arrangement for a coffee machine includes a filter holder adapted to receive a filter to be filled with ground coffee. The filter holder includes an outlet below which a container to be filled with coffee may be positioned. A bracket is arranged on the coffee machine. The bracket and coffee holder are constructed so that the filter holder is removably attached to the bracket. A locking mechanism is attached to the bracket to lock the filter holder in a locked position when the container to be filled with coffee is arranged below the outlet.

14 Claims, 6 Drawing Sheets

COFFEE MACHINE

CROSS-REFERENCE TO RELATED APPLICATION

This application claims the priority of German Patent Application DE 20 2012 103 158.2, filed on Aug. 21, 2012, the subject matter of which is incorporated herein by reference.

BACKGROUND OF THE INVENTION

The present invention relates to a coffee machine, comprising a filter holder into which can be inserted a filter bag to be filled with ground coffee, as well as to a bracket for attaching said filter holder thereto, in such a way that it can be detached again, wherein a container that can be filled with coffee is arranged below an outlet of the filter holder in the position where the filter holder is locked in place.

Known are coffee machines where a brewing unit feeds hot water into a filter holder with therein arranged filter paper insert that is filled with ground coffee. An outlet is provided on the bottom of the filter holder which allows the brewed coffee to flow into a container which is arranged below the filter holder. In most cases, the filter holder can be inserted into a guide that is arranged on an upper edge of the filter holder. To replace the filter bag, the filter holder must first be removed from hot water supply region and can then be moved around freely for disposing of the used filter paper insert. This action is considered cumbersome since numerous steps are required for taking out the filter holder. The problem furthermore exists that the filter holder must be positioned in a defined position above the container, so as to ensure that the container is arranged below the outlet. The container must be positioned precisely, relative to the filter holder, in particular if a closable valve is provided on the outlet. Numerous coffee machines do not offer the security of preventing an incorrect positioning of the filter holder.

SUMMARY OF THE INVENTION

It is therefore the object of the present invention to create a coffee machine which permits an easy removal and insertion of the filter holder and furthermore also ensures a precise positioning of this holder.

The above and other objects are accomplished according to the invention, wherein in one embodiment there is provided an arrangement for a coffee machine, comprising: a filter holder adapted to receive a filter to be filled with ground coffee, the filter holder including an outlet below which a container to be filled with coffee is positionable; a bracket arranged on the coffee machine, the bracket and coffee holder being constructed so that the filter holder is removably attached to the bracket; and a locking mechanism attached to the bracket to lock the filter holder in a locked position when the container to be filled with coffee is arranged below the outlet.

Thus, by virtue of the locking mechanism assures a precise positioning of the filter holder in the bracket, wherein the filter holder can be pulled off easily during the unlocking of the locking mechanism, thereby facilitating assembly and dismantling operations.

According to one embodiment of the invention, the filter holder in the locked-in position may be secured against being pulled from the holder. This avoids incorrect activations and prevents an undesirable movement of the filter holder during the brewing operation. To unlock the filter holder, an activation element can be provided which is operated by the user during a dismantling operation.

The locking mechanism may include at least one movable latch which can be locked in place on the bracket. The at least one latch in this case can be pre-tensioned via a spring into the locked position, so that the latch can be locked in place easily when the filter holder is installed on the bracket. Two latches can also be provided which are pre-tensioned in opposite directions via the spring, to obtain a secure locking in place of the filter holder on the bracket.

For an easy activation, the filter holder may include a handle with a thereon arranged activation element. As a result, an activation with one hand is possible, wherein the filter holder may be gripped with one hand and the activation element may be simultaneously activated. In this way, the user can remove the filter holder with one hand from the coffee machine and can also install it again in this way, for example by inserting it in horizontal direction.

According to a different embodiment of the invention, the bracket for the filter holder may be arranged in the lower region of the filter holder, adjacent to the outlet. A particularly precise positioning can thus be achieved since the bracket adjacent to the output ensures a high functional safety for the filter holder, especially when a valve is used at the outlet. The bracket for the filter holder could also be provided at an upper edge of the filter holder, wherein the arrangement at the lower edge of the filter holder ensures an extremely compact configuration. In the latter case, the bracket can be embodied as a holding bar which essentially projects horizontally from a body of the coffee machine. This holding bar can comprise a V-shaped receptacle, designed to accommodate a projection on the filter holder, wherein the filter holder can be inserted into the V-shaped receptacle while locking it into place with the locking or locking mechanism.

The filter holder may include a projecting edge along the bottom which can be placed onto a flat surface, so the filter holder may remain standing. The edge in that case projects from the underside of the filter holder so that the filter holder can be put down, thereby simplifying the handling. In addition, the locking mechanism can be arranged within this edge, so that the locking mechanism is not visible from the outside.

To configure the locking mechanism with only a few components, the activation element may be embodied integrally with at least one latch, wherein this latch can be positioned pivoting on the filter holder. The activation element can be connected via one or several bendable webs to the at least one latch, so that during a displacement of the activation element, the latch is correspondingly released from the locking position.

BRIEF DESCRIPTION OF THE DRAWINGS

The invention is explained in further detail in the following, with the aid of an exemplary embodiment and with reference to the enclosed drawings, wherein these show in.

DETAILED DESCRIPTION

Figure 1:
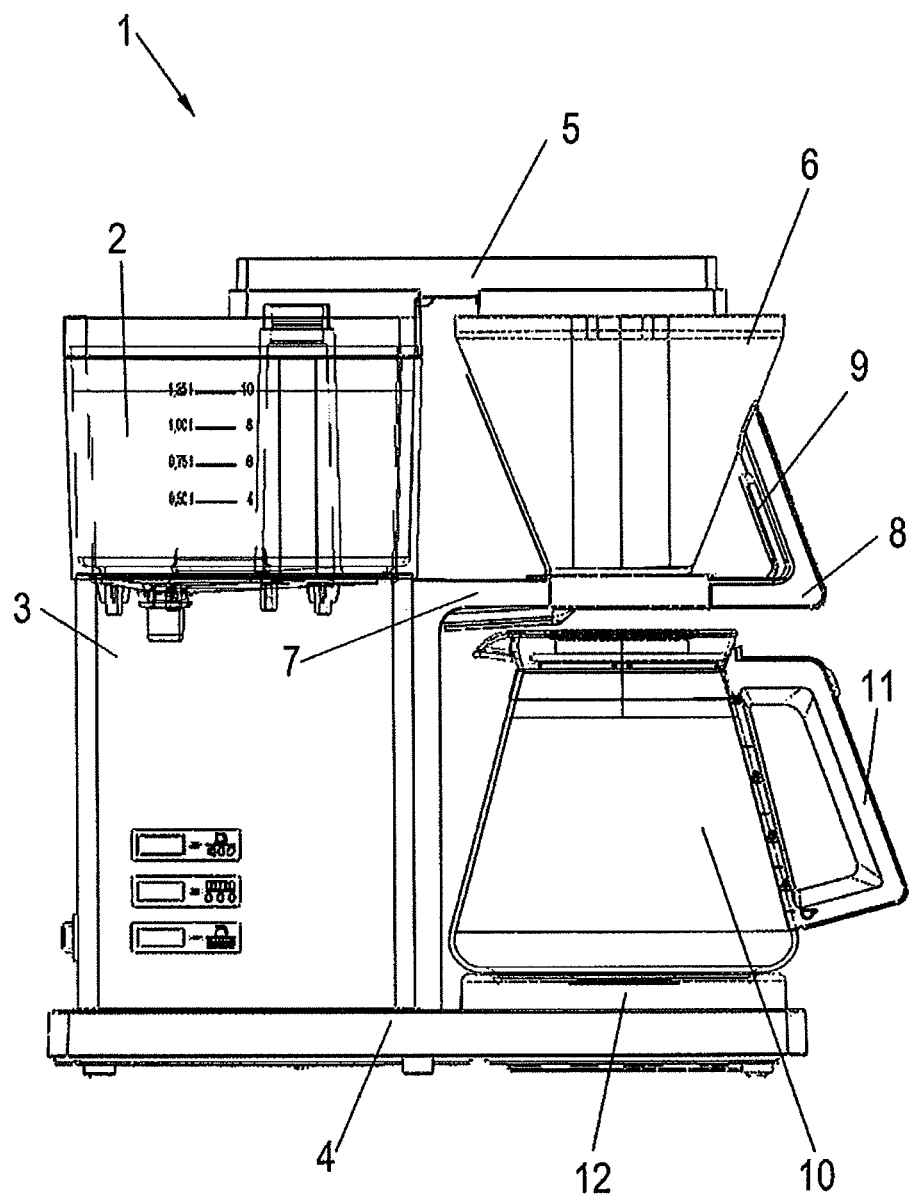
FIG. 1 A view from the side of a coffee machine according to the invention.

Referring to FIG. 1, there is shown a coffee machine 1 that comprises a water reservoir 2 arranged on a unit 3, provided with a control unit and a heating unit for heating the water, as well as a pump and the respective switches, wherein this unit 3 is arranged on a base plate 4.

On the top of the coffee machine 1, a horizontal line 5 projects through which hot water can flow into a filter holder 6. A filter, for example a filter paper insert containing ground coffee, can be arranged inside the filter holder 6, wherein the filter holder 6 is secured via a bracket 7 on the coffee machine 1, so that it can be detached again. The filter holder 6 comprises a bow-shaped handle 8 with an activation element 9. A container 10, in particular a glass carafe, with a handle segment 11 is provided below the filter holder 6 and is positioned on a heating plate 12 on the bottom plate 4.

Figure 2:
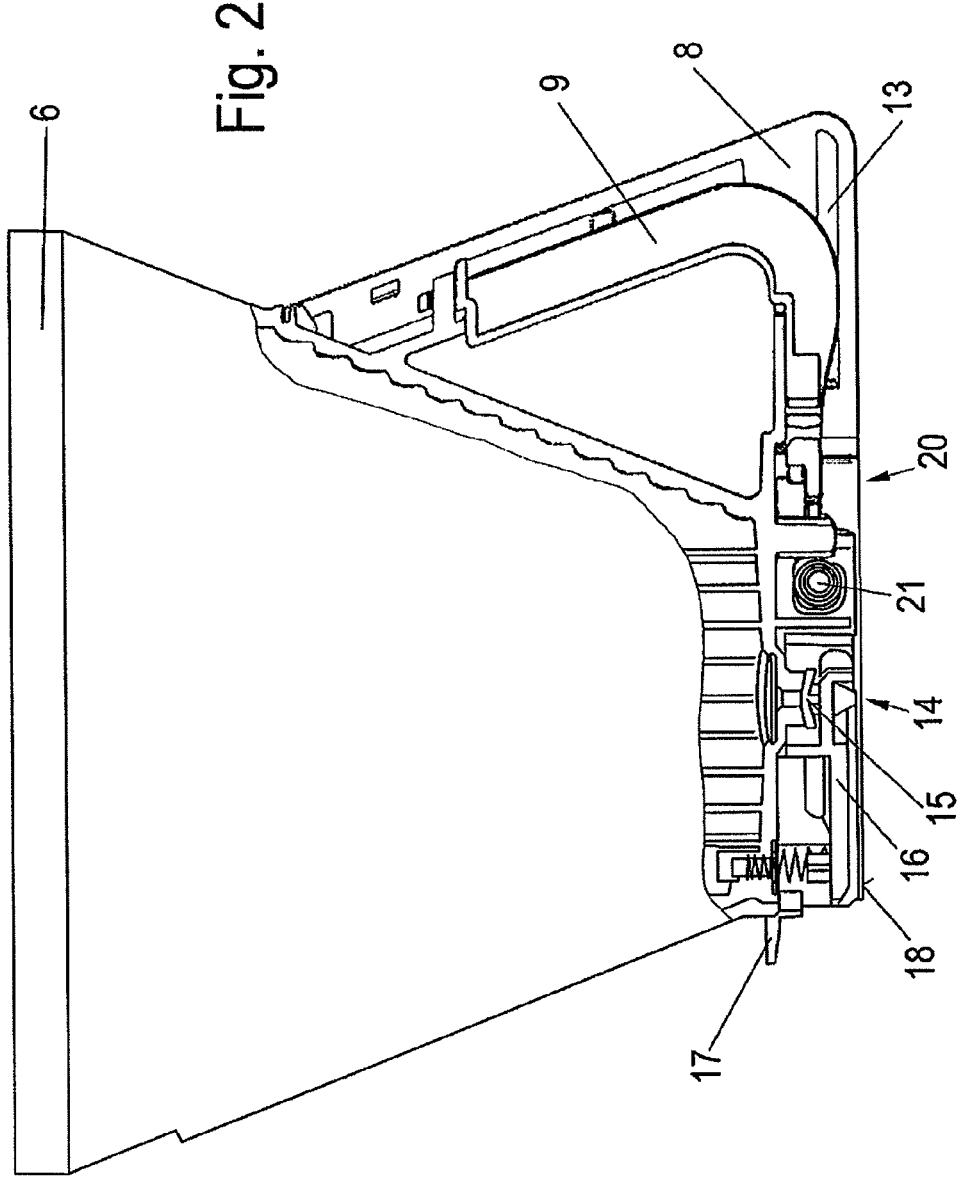
FIG. 2 An enlarged view of the filter holder for the coffee machine according to FIG. 1.

The filter holder 6 is shown in further detail in FIG. 2. One or several guide elements 13 in the form of grooves or ribs are provided on the handle 8, so that the activation element 9 can be positioned displaceable on the handle 8.

The filter holder 6 is tapered toward the lower end in the shape of a wedge or truncated cone and comprises an outlet 14 at the lower end which can be closed off by a valve 15. The valve 15 can be opened with the aid of a lever 16 which is pivoted when the container 10 is inserted below the filter holder 6.

Embodied on the filter holder 6 is an essentially horizontal outer filter plate 17 which is provided with an opening that serves to channel the coffee into the carafe in case of an overflow. Corresponding channeling devices and an overflow opening can be embodied for this on the outside of the filter holder 6. The filter holder 6 is embodied flat on its underside 18 and can be placed onto a flat surface, such that it remains standing.

A locking mechanism 20 is furthermore provided in the lower region of the filter holder 6, adjacent to the outlet 14. The locking mechanism 20 may include two latches 21 that can be locked in place on the bracket 7.

Figure 3:
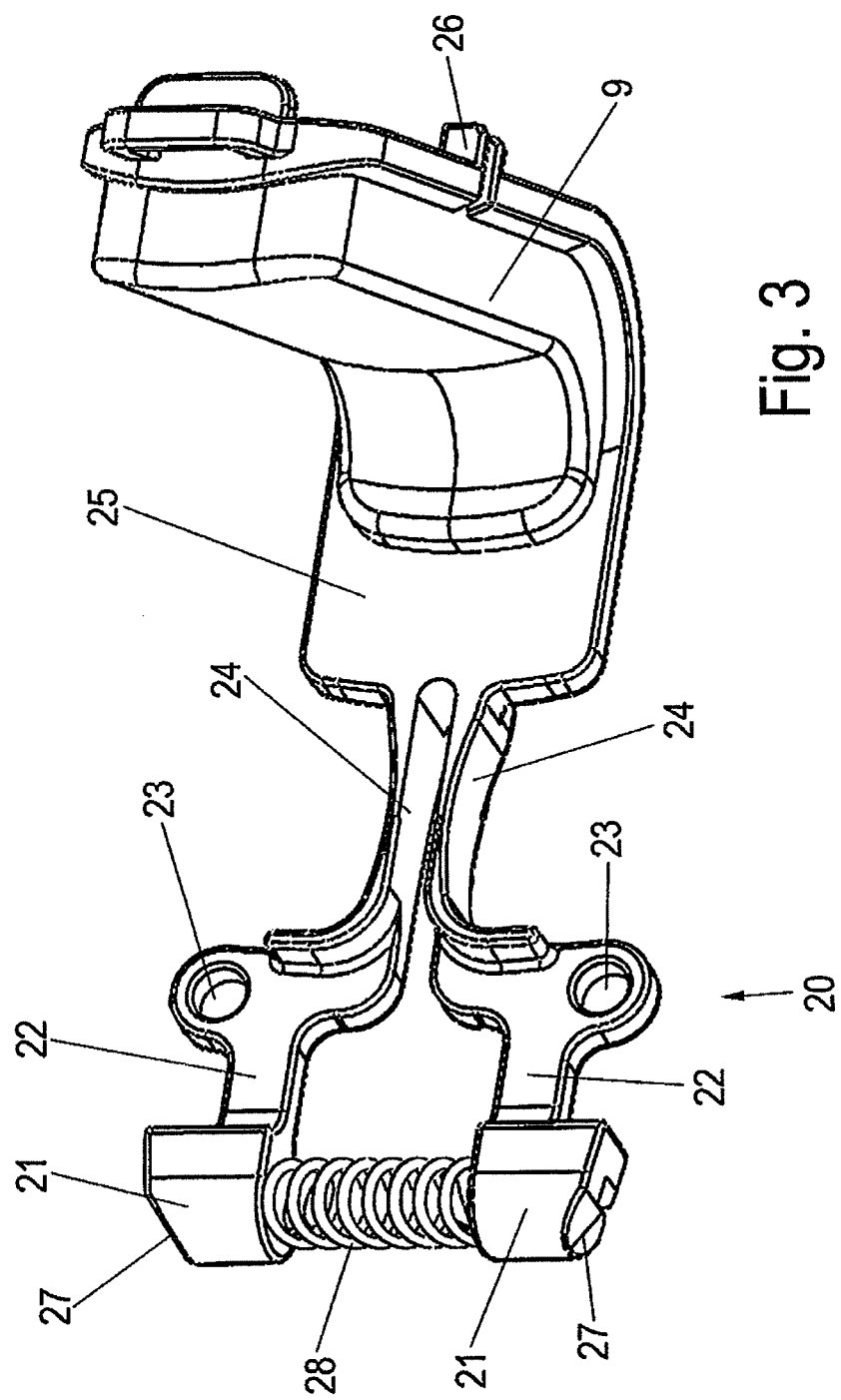
FIG. 3 A perspective view of the locking mechanism for the filter holder according to FIG. 2.

FIG. 3 shows the locking mechanism 20 together with the activation element 9. The activation element 9 is made of plastic and may be connected integrally with the two latches 21. The latches 21 are formed onto a lever 22 which is provided with an opening 23 for inserting a pivot pin on the filter holder 6. The lever 22 is furthermore connected via a bendable web 24 to a plate-shaped section 25 of the activation element 9. One or several guide elements 26 may be embodied on this activation element 9 to operate jointly with the guide elements 13 that are embodied on the handle 8, so that the activation element 9 may be positioned displaceable on the handle 8.

The two latches 21 may be pre-stressed toward the outside via a spring 28, wherein a slanted stop face 27 may be embodied on the outside of the latches 21, so that the latches 21 are compressed during the insertion into the bracket 7.

Figure 4:
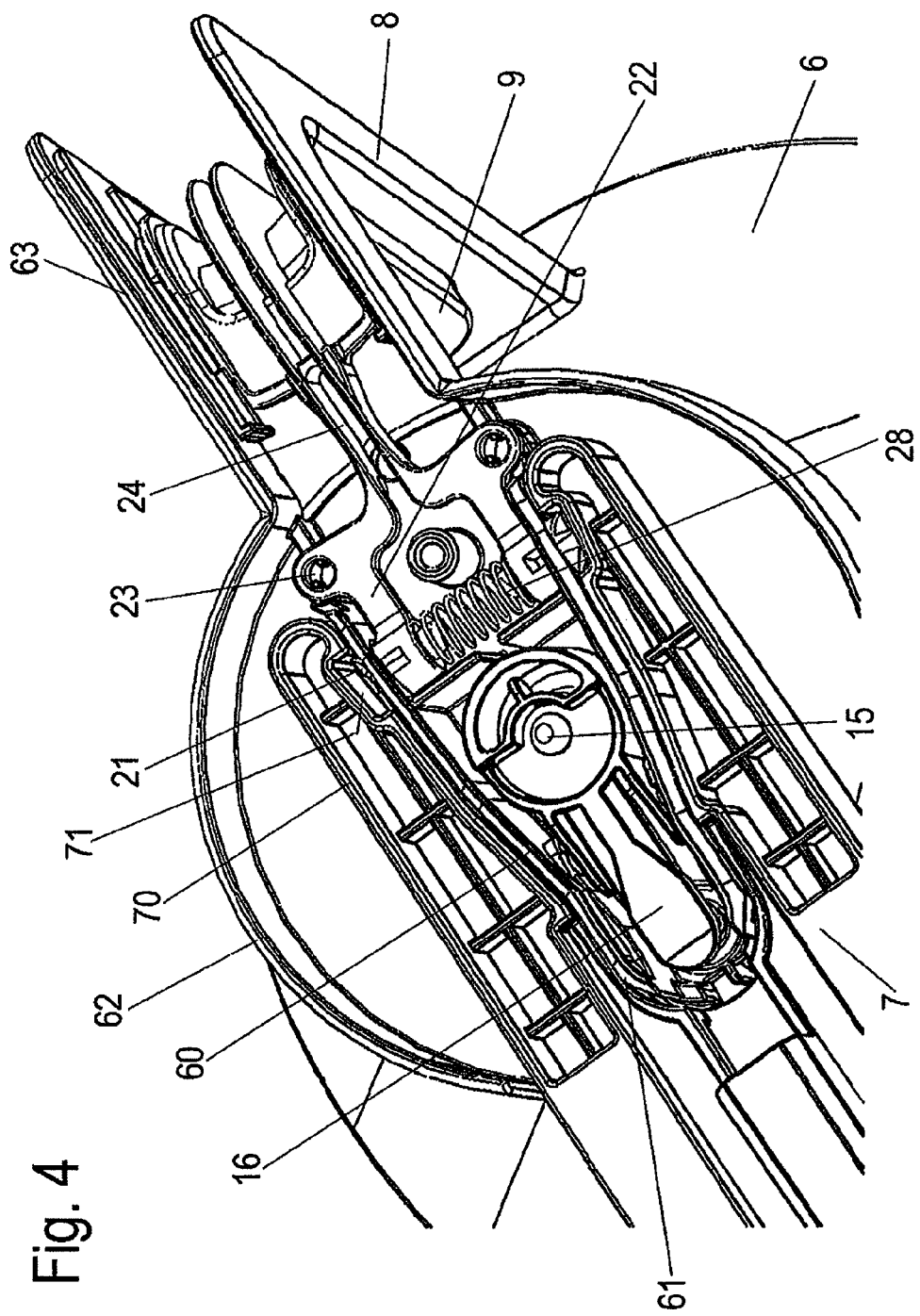
FIG. 4 A perspective view from below of the filter holder in the fully assembled position.

FIG. 4 shows the filter holder 6 in the position where it is installed on the bracket 7. The openings 23 are positioned to be rotatable on the filter holder 6, and the latches 21 are pushed by the spring 28 toward the outside, so that they extend through an edge 60 on the underside of the filter holder 6. The edge 60 converges wedge-shaped and encompasses a tip 61, wherein the edge 60 and the tip 61 can be inserted into an essentially V-shaped receptacle on the bar-shaped bracket 7. Furthermore visible is the valve 15 which can be activated with the aid of the lever 16.

In the locked position, the latches 21 engage in receptacles in the bracket 7, so that the filter holder 6 is protected against being pulled from the bracket 7.

Figure 5:
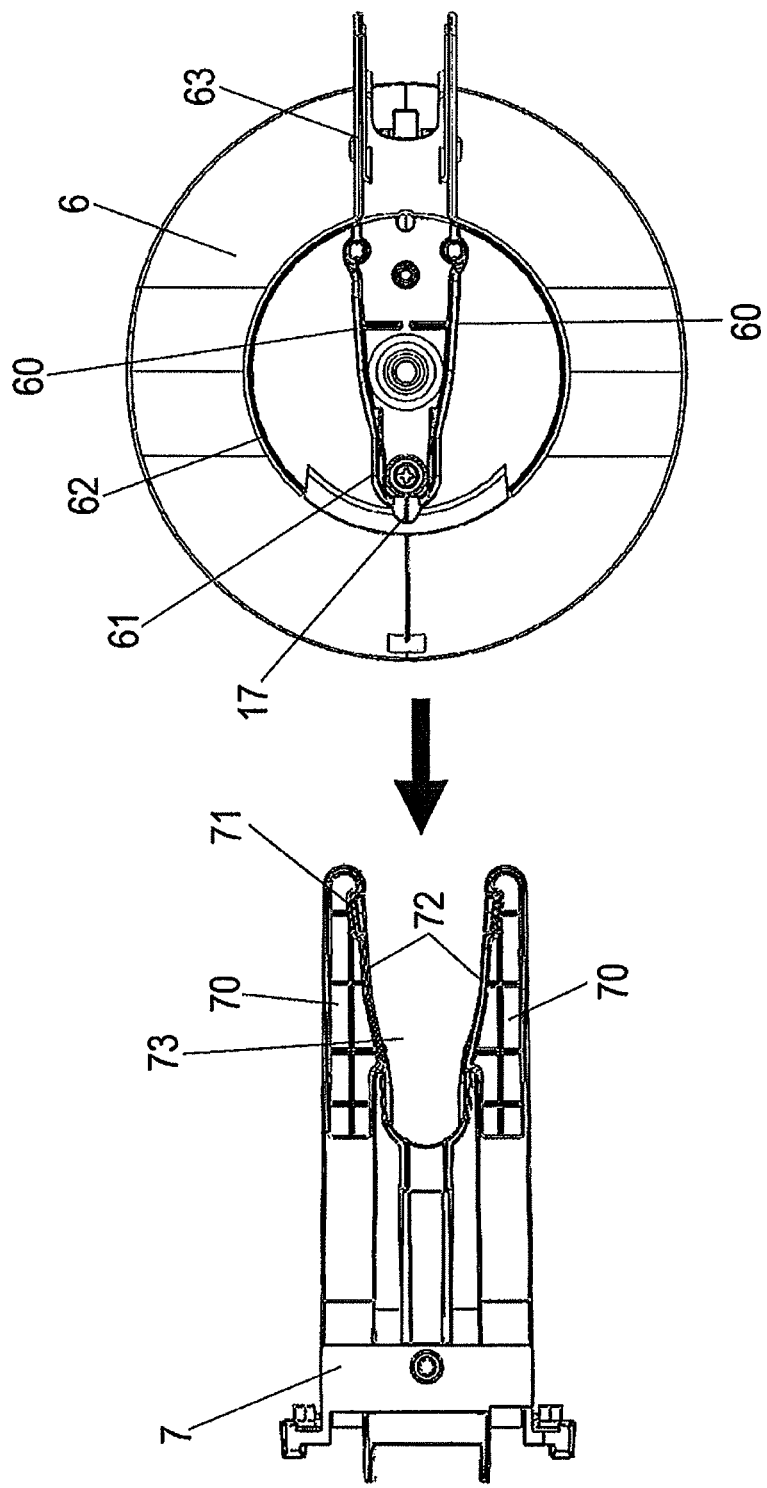
FIG. 5 A view from below of the filter holder without a locking mechanism during the assembly.

The assembly of the filter holder 6 without the locking mechanism is shown in FIG. 5. The bracket 7 is embodied as a holding bar, provided with an essentially V-shaped receptacle 73, which is surrounded by two legs 70. A receptacle 71 for accommodating a latch 21 is embodied on the inside of each leg 70. The V-shaped receptacle 73 comprises inside walls 72 that surround an edge 60 on the underside of the filter holder 6, as well as the tip 61. The filter holder 6 additionally comprises a ring-shaped outer edge 62 in the lower region which extends to two webs 63 that are embodied on the underside of the handle 8. The edge 60, the tip 61, the edge 62, as well as the webs 63 are embodied such that they form a level, lower support surface for the filter holder 6.

Figure 6:
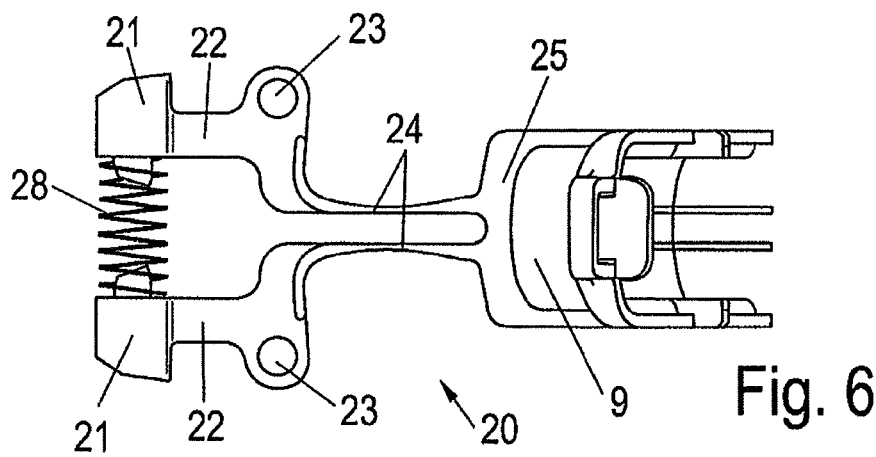
FIGS. 6 & 7 Two views of the locking mechanism for the filter holder, showing different positions.
Figure 7:
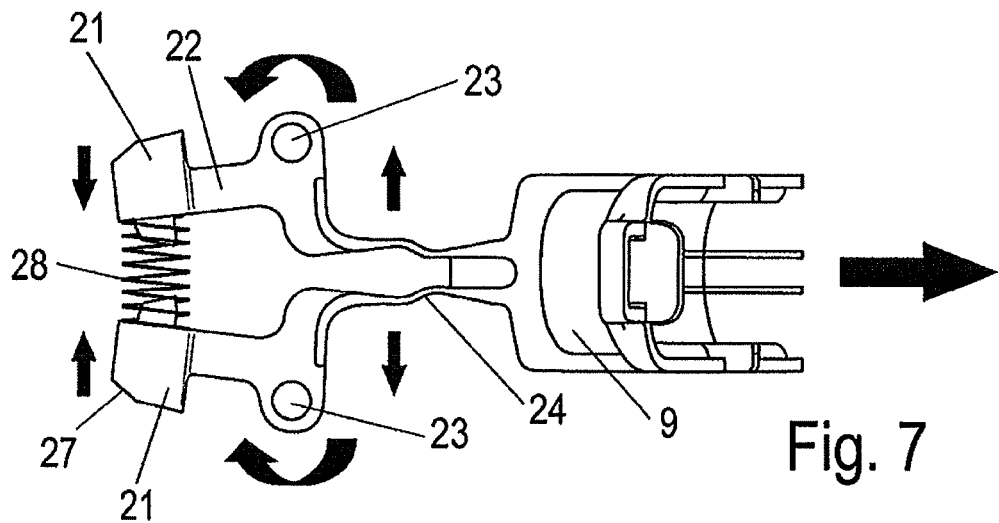

The locking mechanism 20 of the filter holder 6 is shown in further detail in FIGS. 6 and 7. FIG. 6 shows the locking mechanism in the locked position in which the spring 28 presses the latches 21 toward the outside. If the activation element 9 is pulled toward the handle 8, the position shown in FIG. 7 is reached. By pulling the activation element 9 toward the right side, as shown in FIG. 7, the webs 24 are also correspondingly displaced, thus causing the respective lever 22 to be pivoted around the axis in the opening 23. By pivoting the levers 22, the latches 21 are pushed counter to the force of the spring 28 toward the inside and thus are disengaged from the receptacles 71 on the bracket 7. The filter holder 6 can then be pulled without resistance from the bracket 7 to replace a filter for the ground coffee. Following this, the filter holder 6 can again be pushed into the bracket 7, wherein the activation element 9 can then optionally be pulled tight in order to compress the latches 21, or the slanted stop faces 27 on the latches are made to engage in the legs 70 of the bracket 7 during the insertion of the filter holder 6 and are thus compressed. The latches 21 can then be locked in place in the receptacles 71 during the insertion of the filter holder 6.

Figure 8:
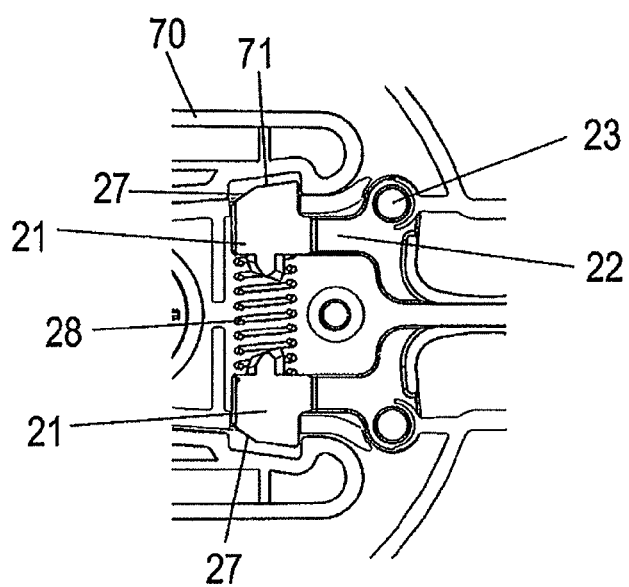
FIG. 8 A detailed view of the locking mechanism for the filter holder.

The locked position of the latches 21 is shown in further detail in FIG. 8. The latches 21 are pressed via the spring 28 into the receptacles 71, to prevent the filter holder 6 from being pulled out. Tolerances which exist of necessity can thus be compensated by providing two latches 21.

For the exemplary embodiment shown herein, two latches 21 are provided for locking in place the filter holder 6 on the bracket 7. Of course, it is also possible to provide only one latch 21 or more than two latches 21. The locking or unlocking of the activation element 9 can furthermore be realized through a sliding movement or by other mechanical means. In addition, several components and other different locking mechanisms can also be used.

It will be understood that the above description of the present invention is susceptible to various modifications, changes and adaptations, and the same are intended to be comprehended within the meaning and range of equivalents of the appended claims.

What is claimed is:
1. An arrangement for a coffee machine, comprising:
   a filter holder adapted to receive a filter to be filled with ground coffee, the filter holder including an outlet below which a container to be filled with coffee is positionable;
   a bracket arranged on the coffee machine, the bracket and filter holder being constructed so that the filter holder is removably attached to the bracket;

a locking mechanism attached to the bracket to lock the filter holder in a locked position when the container to be filled with coffee is arranged below the outlet; and a handle arranged on the filter holder and including an activation element to unlock the filter holder from the locked position.

2. The coffee machine according to claim 1, wherein the filter holder in the locked-in position is secured against being pulled from the bracket.

3. The coffee machine according to claim 1, wherein the locking mechanism comprises at least one movable latch lockable in place on the bracket.

4. The coffee machine according to claim 3, wherein the locking mechanism includes a spring to pre-tension the at least one latch to lock the filter holder in the locked position.

5. The coffee machine according to claim 1, wherein the bracket for the filter holder is arranged in a lower region of the filter holder adjacent to the outlet of the filter holder.

6. The coffee machine according to claim 1, wherein the bracket comprises a holding bar on which the filter holder is lockable in place.

7. The coffee machine according to claim 6, wherein the filter holder includes a projection and the holding bar comprises a substantially V-shaped receptacle to receive the projection of the filter holder.

8. The coffee machine according to claim 7, wherein the projection of the filter holder is fittable into the V-shaped receptacle of the holding bar to lock in place the locking mechanism.

9. The coffee machine according to claim 1, wherein the filter holder has a bottom and comprises a projecting edge along the bottom so that when the bottom of the filter holder is placed on a flat surface, the filter holder remains standing.

10. The coffee machine according to claim 1, wherein the locking mechanism includes at least one latch and the activation element with the at least one latch.

11. The coffee machine according to claim 10, wherein the at least one latch is positioned pivoting on the filter holder.

12. The coffee machine according to claim 1, further including at least one bendable web to connect the activation element to the at least one latch.

13. The coffee machine according to claim 1, further including a closable valve located on the filter holder at the outlet.

14. An arrangement for a coffee machine, comprising:
a filter holder adapted to receive a filter to be filled with ground coffee, the filter holder including an outlet below which a container to be filled with coffee is positionable;
a bracket arranged on the coffee machine, the bracket and filter holder being constructed so that the filter holder is removably attached to the bracket; and
a locking mechanism, including at least one latch, attached to the bracket to lock the filter holder in a locked position when the container to be filled with coffee is arranged below the outlet, wherein the at least one latch is positioned pivoting on the filter holder.

\* \* \* \* \*